US011003962B2

(12) United States Patent
Ratner

(10) Patent No.: US 11,003,962 B2
(45) Date of Patent: May 11, 2021

(54) MULTI-TASK IMAGE CLASSIFIER FOR CLASSIFYING INHERENTLY ORDERED VALUES

(71) Applicant: International Business Machines Corporation, Armonk, NY (US)

(72) Inventor: Vadim Ratner, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 16/106,128

(22) Filed: Aug. 21, 2018

(65) Prior Publication Data
US 2020/0065636 A1 Feb. 27, 2020

(51) Int. Cl.
*G06K 9/66* (2006.01)
*G06K 9/62* (2006.01)

(52) U.S. Cl.
CPC ............. *G06K 9/66* (2013.01); *G06K 9/6281* (2013.01)

(58) Field of Classification Search
None
See application file for complete search history.

(56) References Cited

U.S. PATENT DOCUMENTS

| 8,055,593 | B2 | 11/2011 | Rosales et al. | |
|---|---|---|---|---|
| 8,249,366 | B2 | 8/2012 | Mei et al. | |
| 10,013,436 | B1 | 7/2018 | Cai et al. | |
| 2006/0210133 | A1 | 9/2006 | Krishnan et al. | |
| 2017/0140124 | A1 | 5/2017 | Sehgal et al. | |
| 2017/0200266 | A1 | 7/2017 | Podilchuk et al. | |
| 2018/0214105 | A1* | 8/2018 | Anavi | A61B 6/502 |
| 2018/0365532 | A1* | 12/2018 | Molchanov | G06N 3/088 |
| 2020/0012894 | A1 | 1/2020 | Lee | |

OTHER PUBLICATIONS

Geras, et al., "High-Resolution Breast Cancer Screening With Multi-View Deep Convolutional Neural Networks", 8 pages, Nov. 6, 2017, [https://arxiv.org/pdf/1703.07047.pdf].
Marias, et al., "Automatic Labelling and Bi-Rads Charactersiation of Mammogram Densities", Conf Proc IEEE Eng Med Biol Soc. 2005;6:6394-8, 1 page, 2005, [https://www.ncbi.nlm.nih.gov/pubmed/17281731].
Read, et al., "Multi-Label Classification Using Labels as Hidden Nodes", 2015, [arXiv preprint arXiv:1503.09022].

* cited by examiner

*Primary Examiner* — Leon Viet Q Nguyen
(74) *Attorney, Agent, or Firm* — Stephanie L. Carusillo

(57) ABSTRACT

In an approach for classifying an image containing a continuous characteristic using an image classifier, an image tagged with a single value is received, wherein the single value is from a set of ordered value. A processor sets at least two thresholds based on the set of ordered values. A processor derives at least two labels according to the single value tagged in the image and the at least two thresholds. A processor runs image through an image classifier. A processor receives at least two predictions from the image classifier based on the at least two labels. A processor adjusts the image classifier based on differences between the at least two predictions and the at least two labels.

17 Claims, 3 Drawing Sheets

MULTI-TASK IMAGE CLASSIFIER FOR CLASSIFYING INHERENTLY ORDERED VALUES

BACKGROUND

The present invention relates generally to the field of neural networks, and more particularly to image classification using a neural network.

A neural network uses mathematical modeling to perform tasks without any task-specific programming. A neural network is trained by using example data sets. A neural network can be used in a wide variety of applications including, but not limited to, function representation, pattern recognition, and image classification. A convolutional neural network is set up similarly to a neural network but makes the explicit assumption that the inputs are images allowing certain parameters to be set up for images. A convolutional neural network used for image classification takes an input image and outputs a binary decision (i.e., positive or negative) as to whether the image is of a certain classification. During training, the convolutional neural network receives a data set of input images already labeled with a certain classification. Incorrect outputs can be corrected using a cost function, which updates weights and biases to the intermediate layers of the convolutional neural network in order to attain the correct output. Eventually, the convolutional neural network is able to classify a non-pre-designated image.

SUMMARY

Aspects of an embodiment of the present invention disclose a method, computer program product, and computer system for classifying an image containing a continuous characteristic using a multi-task image classifier. A processor receives an image tagged with a single value, wherein the single value is from a set of ordered values. A processor sets at least two thresholds based on the set of ordered values. A processor derives at least two labels according to the single value tagged in the image and the at least two thresholds. A processor runs the image through an image classifier. A processor receives at least two predictions from the image classifier based on the at least two labels. A processor adjusts the image classifier based on differences between the at least two predictions and the at least two labels.

DETAILED DESCRIPTION

Figure 1:
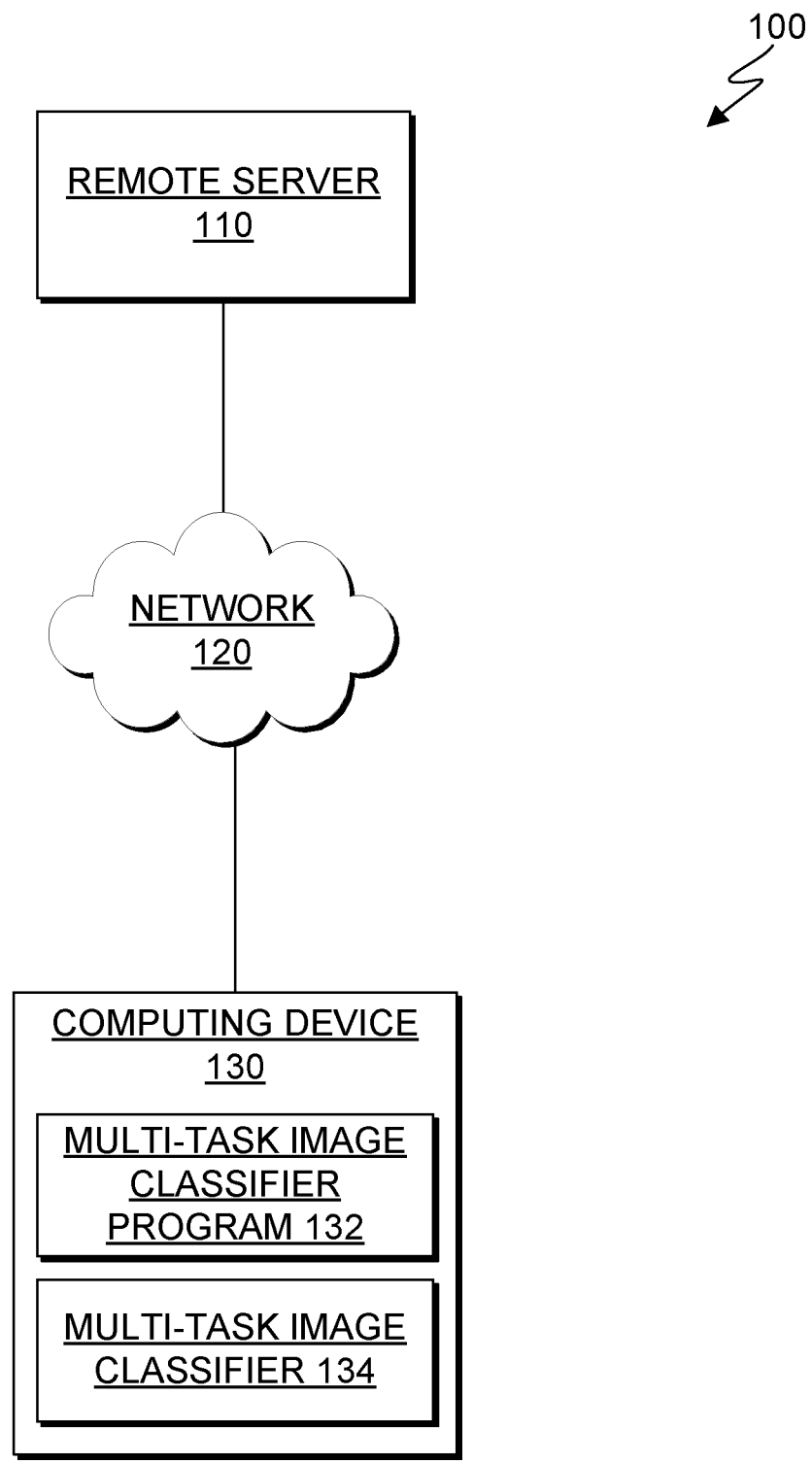
FIG. 1 depicts a block diagram of a neural network computing environment, in accordance with an embodiment of the present invention.

Embodiments of the present invention recognize the importance of properly classifying data that has a continuous characteristic, such as a risk value, expressed by discrete values that have an inherent order. Current technology can train a convolutional neural network to classify an image that is tagged with a label designed around one threshold (e.g., label is either "high risk" or "low risk", given risk values between 0 and 10) and outputs a prediction value indicating which label was tagged in the image. However, this type of classification, using a traditional convolutional neural network, is inefficient due to several factors. First, a continuous characteristic cannot be fully represented by a single threshold and a single label. Second, an input image might be mislabeled by mistake, resulting in incorrect classification and non-optimal training of the convolutional neural network. Finally, an input data set may be imbalanced, with one label being far more prevalent than the other (e.g. there are significantly more "low risk" labels than "high risk" labels). These imbalanced data sets could lead to further non-optimal training. Thus, embodiments of the present invention recognize that there is a need for the ability to more efficiently classify images that have a continuous characteristic.

Limitations of the current technology make it difficult and inefficient to train a convolutional neural network to classify images tagged with a label that represents one discrete value of a set of ordered values for a continuous characteristic. This method of training would either ignore the relationship between labels, and thus inefficiently use the data available for training, or require additional layers of code in order to deduce the relation between labels. Additionally, this method of training would need a large data set to teach the convolutional neural network the relationship between discrete, ordered labels. However, large data sets may not be available. Additionally, this method could still expose the convolutional neural network to imbalanced data sets during training, and the resulting outputs would then mischaracterize the image.

A multi-task classifier is a subset of convolutional neural networks that trains on multiple tasks to simultaneously complete multiple classifications based on multiple labels. During training, a multi-task classifier receives an input image that is tagged with a single value, completes multiple tasks according to multiple labels (i.e., characterizes image according to multiple thresholds), and outputs multiple predictions according to the multiple labels. The multi-task classifier analyzes and classifies all labels in the image simultaneously. The use of multiple labels allows for a more defined understanding of the image. Instead of a single output based around a single threshold, a multi-labelled image allows for multiple prediction outputs for the multiple tasks.

Embodiments of the present invention provide a method for more efficiently training a multi-task image classifier to complete multiple classifications of a continuous characteristic defined by a set of ordered values in which each classification is defined by a threshold. Embodiments of the present invention provide a program for training a multi-task image classifier that receives an input image that has been tagged with a single value, derives multiple ground truth labels of ranges of the ordered values, runs the image through the multi-task image classifier, and receiving predictions according to those labels. Embodiments of the present invention derive ground truth labels that represent a range of overlapping values, and each label incrementally narrows the range of values. Embodiments of the present invention derive the multiple labels in the form of binary questions, i.e., does image meet threshold A, does image meet threshold B, does image meet threshold C. The multi-task image classifier outputs a prediction vector containing a positive or negative prediction for each label of whether the image meets each threshold. For example, for an image for which three labels were derived, the multi-task image classifier may output a prediction vector of {1, 1, 0}, in which a positive prediction (i.e., one (1)) indicates that the image met the threshold and a negative prediction (i.e., zero (0)) indicates that the image failed to meet a threshold. The multiple labels, each denoting a range of values, allow the multi-task image classifier to implicitly understand the relationship between the ordered values. Therefore, in this method, additional coding is not required to explain the relationship between the ordered values. Furthermore, the use of multiple ranges of values as labels decreases the chance of mismarked labels negatively impacting the output prediction. Additionally, the use of multiple ranges of values as labels allows for more robust training of the multi-task image classifier since there is less of an issue with imbalanced data sets.

Embodiments of the present invention provide a multi-task classifier that can be used to classify risk values, wherein the risk values are a continuous characteristic that can be broken up into discrete ranges in a set of multiple labels. Additional embodiments of the present invention provide a multi-task classifier that can be used to classify failure probabilities wherein the failure probabilities are a continuous characteristic that can be broken up into discrete ranges in a set of multiple labels.

An example embodiment of the present invention provides a multi-task image classifier to classify images from the Breast Imaging And Reporting Data System (BIRADS) to help with breast cancer diagnosis by characterizing potential malignancies. The categories BIRADS uses includes BIRADS 1 for an image that contains only healthy tissue, BIRADS 2 for an image that contains non-malignant findings (e.g. a cyst), BIRADS 3 for an image that is probably normal but might indicate a 2% chance of cancer, BIRADS 4 for an image that is suspicious and could indicate a 20%-35% chance of cancer, and BIRADS 5 for an image that is highly suspicious and reflects a 95% chance of cancer. Currently, training an convolutional neural network or image classifier for malignancy prediction involves receiving an image tagged with a single BIRADS value, deriving a ground truth label based on a single threshold, running the image through image classifier, receiving a prediction based on the label, and adjusting the image classifier, if necessary, to better predict the label. For example, the ground truth label could be designed around the threshold of BIRADS 3 in which an image labelled BIRADS 3, 4, or 5 should output a positive value indicating "malignancy" and an image labelled BIRADS 1 or 2 should output a negative value indicating "no malignancy". In another example, the ground truth label could be designed around the threshold of BIRADS 2, in which an image labelled BIRADS 1 should output a negative value indicating "no findings" and an image labelled BIRADS 2, 3, 4, or 5 should output a positive value indicating "potential findings". However, this method does not account for the variances in the BIRADS categorization because malignancy is a continuous characteristic, where a BIRADS 5 is significantly more indicative of a malignancy than a BIRADS 3. The use of multiple labels allows for better classification because multiple, related tasks enable the image classifier to better identify a single classification.

Additionally, multi-task image classifiers can be trained to predict outputs using several types of medical labels, such as a malignancy prediction centered around a threshold of a label corresponding to a respective range of BIRADS values, a different characteristic of a tumor (e.g. edge, shape, orientation, etc), and the type of pathology. However, this requires data from different medical domains, and sometimes only BIRADS values might be available.

For this example application, embodiments of the present invention recognize a solution for a more efficient method of training a multi-task image classifier to more accurately predict malignancies using BIRADS values. Embodiments of the present invention provide a program that receives an image that is tagged with a single BIRADS value, derives multiple ground truth labels, in which each ground truth label denotes whether the image is within a range of BIRADS values or not. For example, a first threshold is designed around BIRADS 2 and the resulting potential ground truth labels are "BIRADS 2-5" and "not BIRADS 2-5". A second threshold is designed around BIRADS 3, and the resulting potential ground truth labels are "BIRADS 3-5" and "not BIRADS 4-5". A third threshold is designed around BIRADS 4, and the resulting potential ground truth labels are "BIRADS 4-5" and "not BIRADS 4-5". The ground truth label is derived based on the relationship between the single value tagged in the image and each of the thresholds. Embodiments of the present invention derive ground truth labels that represent overlapping ranges of values, and each label incrementally narrows the range of values. Continuing the example using the three thresholds and label options above, for an image tagged with a BIRADS value of 1, the program derives ground truth labels that read "not BIRADS 2-5", "not BIRADS 3-5", and "not BIRADS 4-5". For an image tagged with a BIRADS value of 2, the program derives ground truth labels that read "BIRADS 2-5", "not BIRADS 3-5", and "not BIRADS 4-5". For an image tagged with a BIRADS value of 3, the program derives ground truth labels that read "BRADS 2-5", "BRADS 3-5" and "not BIRADS 4-5". For an image tagged with a BIRADS value of 4, the program derives ground truth labels that read "BIRADS 2-5", "BRADS 3-5", and "BIRADS 4-5". For an image tagged with a BIRADS value of 5, the program derives ground truth labels that read "BIRADS 2-5", "BIRADS 3-5", and "BIRADS 4-5".

Embodiments of the present invention further provide a program that runs the image through a multi-task image classifier and receives predictions from the multi-task image classifier based on the multiple ground truth labels. The multi-task image classifier analyzes and then classifies the image according to each ground truth label, and outputs a prediction vector that contains a positive prediction (i.e., 1) or a negative prediction (i.e., 0) for each threshold. Continuing the example above, for an image tagged as BIRADS 1, where the derived ground truth labels are "not BIRADS 2-5", "not BIRADS 3-5" and "not BIRADS 4-5", the program receives a prediction vector that should read {0, 0, 0}. For an image tagged as BIRADS 2, where the derived ground truth labels are "BIRADS 2-5", "not BIRADS 3-5" and "not BIRADS 4-5", the program receives a prediction vector that should read {1, 0, 0}, where the first one (1) refers to the label "BIRADS 2-5", and the following zeros (0) refer to "not BIRADS 3-5" and "not BIRADS 4-5", respectively. For an image tagged as BIRADS 3, where the derived ground truth labels are "BIRADS 2-5", "BIRADS 3-5" and "not BIRADS 4-5", the program receives prediction a vector that should read {1, 1, 0}, where the first one (1) refers to the label "BIRADS 2-5", the second one (1) refers to the label "BIRADS 3-5", and the 0 refers to "not BIRADS 4-5", respectively. For an image tagged as BIRADS 4, where the derived ground truth labels are "BIRADS 2-5", "BIRADS 3-5" and "BIRADS 4-5", the program receives a prediction vector that should read {1, 1, 1}, where the first one (1) refers to the label "BIRADS 2-5", the second one (1) refers to the label "BIRADS 3-5", and the final one (1) refers to the label "BRADS 4-5". For an image tagged as BIRADS 5, where the derived ground truth labels are "BIRADS 2-5", "BIRADS 3-5" and "BRADS 4-5", the program receives a prediction vector that should read {1, 1, 1}, where the first one (1) refers to the label "BIRADS 2-5", the second one (1) refers to the label "BIRADS 3-5", and the final one (1) refers to the label "BIRADS 4-5".

An embodiment of the present invention allows for an improved system for malignancy prediction from images. The system derives multiple ground truth labels that are incremented for better training of a multi-task image classifier that, post-training, will be able to better infer a specific BIRADS value for an image. Furthermore, the use of multiple ground truth labels decreases the chance of mismarked images negatively impacting the output prediction. In this embodiment, if an image has been mismarked, it would only affect one output, not the overall analysis of the image. Additionally, deriving ground truth labels that denote overlapping ranges of values allows for more robust training of the system since there is less of an issue with imbalanced data sets, for example where BIRADS 2 is far more prevalent than BIRADS 5, and at least some of the ranges will result in relatively well-balanced sets. Other methods do not combine these three advantages to increase the efficiency and accuracy of image classification by a multi-task image classifier.

The present invention will now be described in detail with reference to the Figures.

FIG. 1 depicts a functional block diagram illustrating neural network computing environment 100, in accordance with an embodiment of the present invention. FIG. 1 provides only an illustration of one embodiment of the present invention and does not imply any limitations with regard to the environments in which different embodiments may be implemented. In the depicted embodiment, neural network computing environment 100 includes remote server 110 and computing device 130 interconnected over network 120. Network 120 can be, for example, a local area network (LAN), a wide area network (WAN) such as the Internet, or a combination of the two, and can include wired, wireless, or fiber optic connections. In general, network 120 can be any combination of connections and protocols that will support communications between remote server 110 and computing device 130. Neural network computing environment 100 may include additional biomedical devices, servers, computers, or other devices not shown.

Remote server 110 operates to store and/or send images to computing device 130. In an embodiment, remote server 110 can store and/or send images from a BIRADS database to computing device 130. In another embodiment, remote server 110 can store and/or send images of mammogram screenings to computing device 130. In some embodiments, server 110 may be a management server, a web server, or any other electronic device or computing system capable of receiving and sending data. In some embodiments, remote server 110 may be a laptop computer, tablet computer, netbook computer, personal computer (PC), a desktop computer, a smart phone, or any programmable electronic device capable of communicating with computer device 130 via network 120. In other embodiments, server 110 represents a server computing system utilizing multiple computers as a server system, such as in a cloud computing environment. Server 110 may include components as described in further detail in FIG. 3.

Computing device 130 operates to run a multi-task image classifier program, such as multi-task image classifier program 132, and an image classifier, such as multi-task image classifier 134. In some embodiments, multi-task image classifier 134 resides on computing device 130. In other embodiments, multi-task image classifier 134 may reside on another computing device (not shown), provided that multi-task image classifier program 132 has access to multi-task image classifier 134. In some embodiments, computing device 130 may be a management server, a web server, or any other electronic device or computing system capable of receiving and sending data. In some embodiments, computing device 130 may be a laptop computer, tablet computer, netbook computer, personal computer (PC), a desktop computer, a smart phone, or any programmable electronic device capable of communicating with remote server 110 via network 120. Computing device 130 may include components as described in further detail in FIG. 3.

Multi-task image classifier program 132 operates as a program for training a convolutional neural network or multi-task image classifier, such as multi-task image classifier 134, to complete multiple tasks designed around multiple thresholds by analyzing and classifying an input image tagged with a single value denoting a value from an ordered set of values for a continuous characteristic of the image. In an embodiment, multi-task image classifier program 132 receives an image tagged with a value. In an embodiment, multi-task image classifier program 132 derives multiple ground truth labels based on the value tagged in the image. In an embodiment, multi-task image classifier program 132 runs the image through multi-task classifier 134. In an embodiment, multi-task image classifier program 132 receives a prediction vector from multi-task classifier 134 where each value of the prediction vector corresponds to a threshold.

Multi-task image classifier 134 receives images from multi-task image classifier program 132 and classifies those images according to ground truth labels derived by multi-task image classifier program 132. In an embodiment, multi-task image classifier 134 receives an image from multi-task image classifier program 132 that is tagged with a single value. In an embodiment, multi-task image classifier 134 analyzes the image according to a set of ground truth labels derived by multi-task image classifier program 132. For example, multi-task image classifier 134 may receive an image from multi-task image classifier program 132 that is tagged with a BIRADS value of 3. In that example, multi-task image classifier 134 must analyze the image according to the labels derived by multi-task image classifier program 132, such as "BIRADS 2-5", "BIRADS 3-5", and "not BIRADS 4-5".

Figure 2:
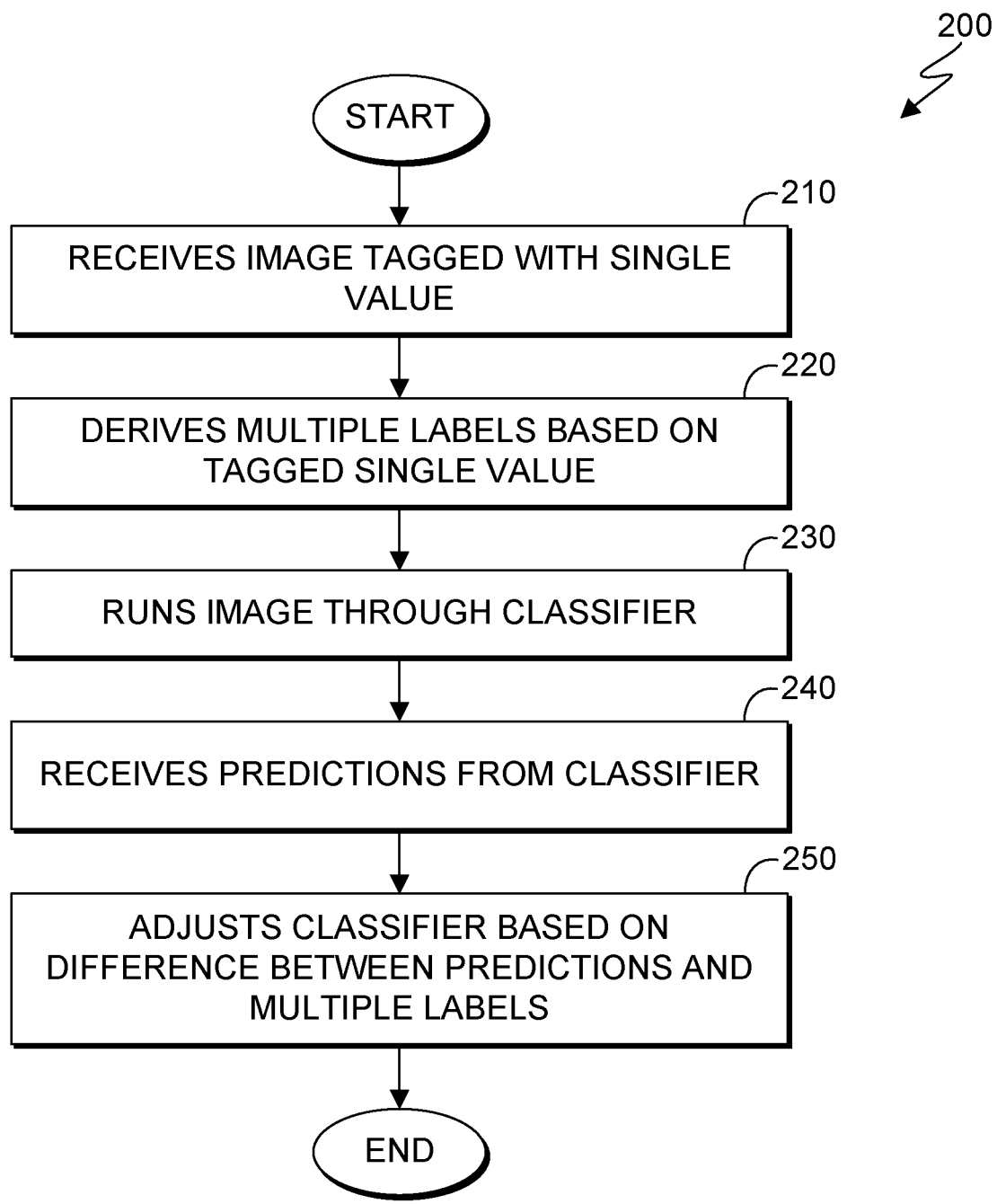
FIG. 2 depicts a flow chart of the steps of a multi-task image classifier program, in accordance with an embodiment of the present invention.

FIG. 2 depicts a flowchart 200 of the steps of multi-task image classifier program 132, in accordance with an embodiment of the present invention. In an embodiment, multi-task image classifier program 132 receives an image tagged with a single value, derives multiple labels from that single value, runs the image through multi-task image classifier 134, and receives a prediction vector from multi-task image classifier 134. It should be appreciated that the process depicted in FIG. 2 illustrates one possible iteration of the process flow, which repeats for each image received by multi-task image classifier program 132.

In step 210, multi-task image classifier program 132 receives an image tagged with a single value from a set of ordered values that denote a continuous characteristic in the image. For example, multi-task image classifier program 132 receives an image tagged with a BIRADS value (i.e. BIRADS 3) that denotes the potential of malignancy in the image. In an embodiment, multi-task image classifier program 132 receives an image tagged with a value from a remote server, such as remote server 110. For example, multi-task image classifier program 132 receives an image tagged with a BIRADS value from a BIRADS database on a remote server, such as remote server 110.

In step 220, multi-task image classifier program 132 derives multiple ground truth labels based on the relationship between the single value tagged in the image and a selected threshold. In an embodiment, multi-task image classifier program 132 derives ground truth labels that represent overlapping ranges of values, and each label incrementally narrows the range of values. In an embodiment, multi-task image classifier program 132 sets at least two tasks to be completed by a multi-task image classifier in the form of a threshold. In another embodiment, multi-task image classifier program 132 enables a user to set at least two tasks to be completed by a multi-task image classifier in the form of a threshold. In an embodiment, each ground truth label is designed around each set threshold and denotes a range of values. In an embodiment, multi-task image classifier program 132 derives at least two ground truth labels which are organized around at least two set thresholds. For example, multi-task image classifier program 132 can derive three ground truth labels designed around the thresholds of BIRADS 2, BIRADS 3 and BIRADS 4. The two ground truth label options for the threshold of BIRADS 2 are "BIRADS 2-5" and "not BIRADS 2-5". The two ground truth label options for the threshold of BIRADS 3 are "BIRADS 3-5" and "not BIRADS 3-5". The two ground truth label options for the threshold of BIRADS 4 are "BIRADS 4-5" and "not BIRADS 4-5".

For example, for an image tagged with a BIRADS value of 1, multi-task image classifier program 132 derives ground truth labels that read "not BIRADS 2-5", "not BIRADS 3-5", and "not BIRADS 4-5". For an image tagged with a BIRADS value of 2, multi-task image classifier program 132 derives ground truth labels that read "BIRADS 2-5", "not BIRADS 3-5", and "not BIRADS 3-5". For an image tagged with a BIRADS value of 3, multi-task image classifier program 132 derives ground truth labels that read "BIRADS 2-5", "BIRADS 3-5" and "not BIRADS 4-5". For an image tagged with a BIRADS value of 4, multi-task image classifier program 132 derives ground truth labels that read "BIRADS 2-5", "BIRADS 3-5", and "BIRADS 4-5". For an image tagged with a BIRADS value of 5, multi-task image classifier program 132 derives ground truth labels that read "BIRADS 2-5", "BIRADS 3-5", and "BIRADS 4-5".

In step 230, multi-task image classifier program 132 runs the image through multi-task image classifier 134, which analyzes and classifies the image according to each ground truth label. For example, if multi-task image classifier program 132 derives two ground truth labels from the value tagged in the image, multi-task image classifier 134 classifies the image according to the two ground truth labels. In an embodiment, multi-task image classifier 134 analyzes the image using a mathematical modeling system central to the convolutional neural network. In an embodiment, multi-task image classifier 134 classifies the image according to the analysis conducted by the mathematical model. For example, multi-task image classifier program 132 run an image tagged with a BIRADS value through multi-task image classifier 134, and multi-task image classifier 134 classifies the image according to the ground truth labels derived in step 220. In an embodiment, multi-task image classifier 134 outputs a prediction vector in which each value in the prediction vector corresponds to a derived ground truth label, respectively.

In step 240, multi-task image classifier program 132 receives a prediction vector from the multi-task image classifier 134, where each value in the prediction vector corresponds to a derived ground truth label. In an embodiment, multi-task classifier program 132 receive a prediction vector with a positive prediction or a negative prediction for each ground truth label, i.e., a one (1) denotes a positive prediction and a zero (0) denotes a negative prediction. In an embodiment, multi-task image classifier program 132 receives a one (1), which indicates that the image met the threshold for a label, and/or receives a zero (0), which indicates that the image did not meet the threshold for a label. For example, for an image tagged as BIRADS 1, where the derived ground truth labels are "not BIRADS 2-5", "not BIRADS 3-5" and "not BIRADS 4-5", multi-task image classifier program 132 receives a prediction vector that should read {0, 0, 0}. For an image tagged as BIRADS 2, where the derived ground truth labels are "BIRADS 2-5", "not BIRADS 3-5" and "not BIRADS 4-5", multi-task image classifier program 132 receives a prediction vector that should read {1, 0, 0}, where the first one (1) refers to the label "BIRADS 2-5", and the following zeros (0) refer to "not BIRADS 3-5" and "not BIRADS 4-5", respectively. For an image tagged as BIRADS 3, where the derived ground truth labels are "BIRADS 2-5", "BIRADS 3-5" and "not BIRADS 4-5", multi-task image classifier program 132 receives prediction a vector that should read {1, 1, 0}, where the first one (1) refers to the label "BIRADS 2-5", the second one (1) refers to the label "BIRADS 3-5", and the 0 refers to "not BIRADS 4-5", respectively. For an image tagged as BIRADS 4, where the derived ground truth labels are "BIRADS 2-5", "BIRADS 3-5" and "BIRADS 4-5", multi-task image classifier program 132 receives a prediction vector that should read {1, 1, 1}, where the first one (1) refers to the label "BIRADS 2-5", the second one (1) refers to the label "BIRADS 3-5", and the final one (1) refers to the label "BIRADS 4-5". For an image tagged as BIRADS 5, where the derived ground truth labels are "BIRADS 2-5", "BIRADS 3-5" and "BIRADS 4-5", multi-task image classifier program 132 receives a prediction vector that should read {1, 1, 1}, where the first one (1) refers to the label "BIRADS 2-5", the second one (1) refers to the label "BIRADS 3-5", and the final one (1) refers to the label "BIRADS 4-5".

In step 250, multi-task image classifier program 132 adjusts multi-task image classifier 134 based on differences between the prediction vector and the ground truth labels. In an embodiment, multi-task image classifier program 132 adjusts multi-task image classifier 134 using a cost function when a wrong prediction is received. This step allows multi-task image classifier program 132 to receive more accurate outcomes for a next set of images. For example, multi-task image classifier program 132 adjusts the analysis of an image tagged with a BIRADS value of 4, where the prediction vector was {0, 0, 0}, incorrectly indicating that the image did not meet the threshold for BIRADS 2, BIRADS 3 or BIRADS 4. Each adjustment step of multi-task image classifier program 132 allows multi-task image classifier 134 to refine analytical step 230 and offer more accurate predictions.

After the training stage for a multi-task image classifier for a specific application, such as malignancy prediction using BIRADS, the multi-task image classifier moves forward to an inference or product stage. In the inference or product stage, the multi-task image classifier can complete its analysis on an untagged image and output a prediction. In embodiments encompassing the inference or product stage, multi-task image classifier program 132 displays the prediction vector through a user interface of a computing device. In an embodiment, multi-task image classifier program 132 aggregates the values of the prediction vector and displays the aggregation of the prediction vector through a user interface (not shown) of computing device 130. In another embodiment, multi-task image classifier program 132 displays a malignancy prediction based on an analysis of the prediction vector. For example, multi-task image classifier program 132 displays "no malignancy" when aggregating a prediction vector reading {0,0,0}. Multi-task image classifier program 132 displays "nonmalignant findings" when aggregating a prediction vector reading {1, 0, 0}. Multi-task image classifier program 132 displays "slight chance of malignancy" when aggregating a prediction vector reading {1, 1, 0} as "slight chance of malignancy". Multi-task image classifier program 132 displays "high likelihood of malignancy" when aggregating a prediction vector reading {1, 1, 1}. In another embodiment, multi-task image classifier program 132 sends the prediction values to a remote server, such as remote server 110, and displays the prediction vector through a user interface of the remote server.

Figure 3:
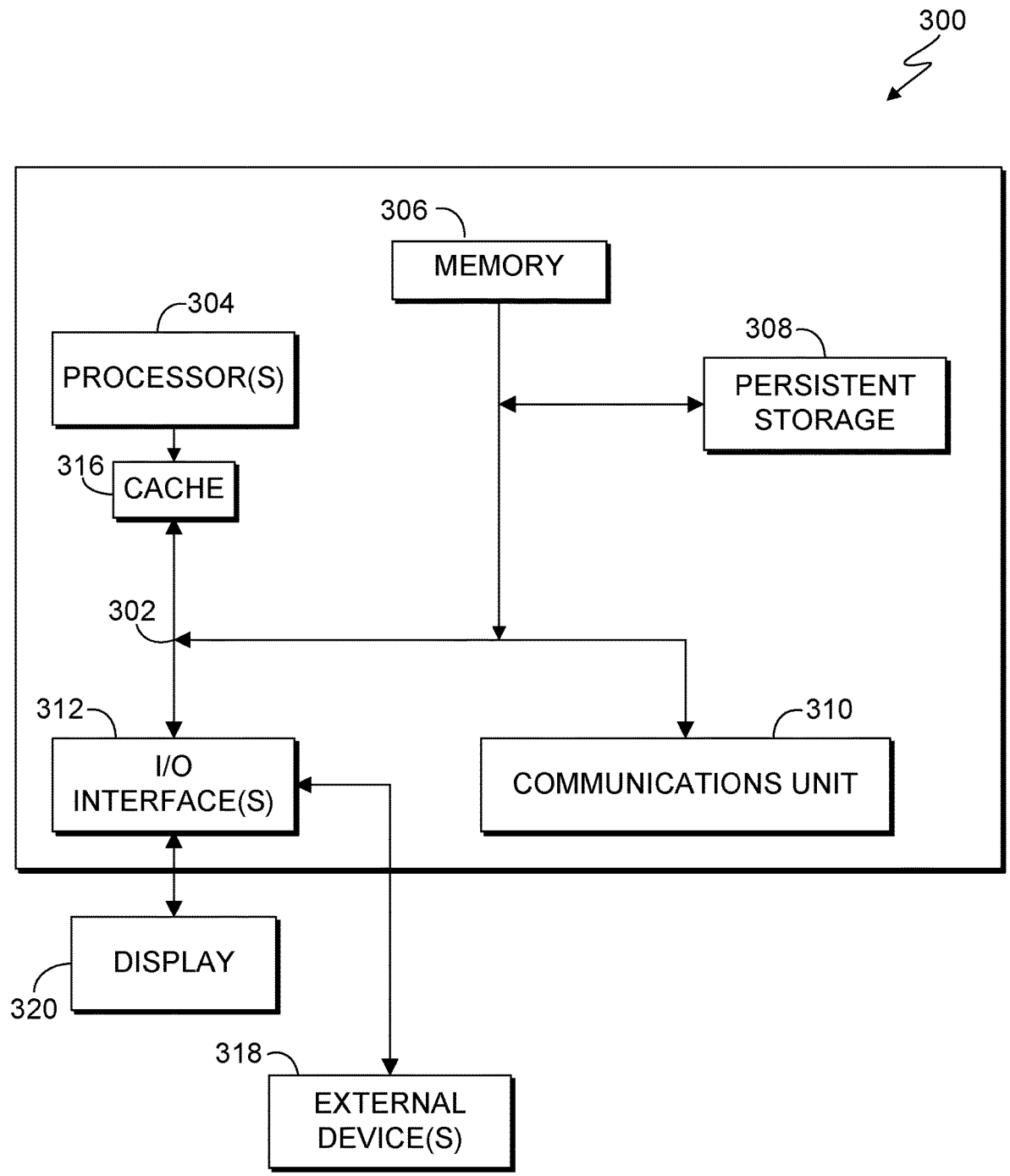
FIG. 3 depicts a block diagram of a computing device of neural network computing environment, in accordance with an embodiment of the present invention.

FIG. 300 depicts a block diagram of computer 300 suitable for remote server 110 and computing device 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Multi-task image classifier program 132 may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs, such as multi-task image classifier program 132, may be downloaded to persistent storage 308 through communications unit 310.

I/O interface(s) 312 allows for input and output of data with other devices that may be connected to server computer 102. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The multi-task image classifier program 132 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    receiving, by one or more processors, an image tagged with a single value, wherein the single value is from a set of ordered values;
    setting, by one or more processors, at least two thresholds within the set of ordered values;
    deriving, by one or more processors, at least two labels for the image from the single value tagged in the image and the at least two thresholds, wherein the at least two labels each represent a different subset range of ordered values of the set of ordered values;
    running, by one or more processors, the image through an image classifier, wherein the image classifier classifies the image based on the at least two labels and the at least two thresholds;
    receiving, by one or more processors, at least two predictions from the image classifier; and
    adjusting, by one or more processors, the image classifier based on differences between the at least two predictions and the at least two labels.

2. The method of claim 1, wherein the set of ordered values define a continuous characteristic in the image.

3. The method of claim 1, wherein:
    a first label of the at least two labels is designed around a first threshold of the at least two thresholds; and
    the first label is selected from the group consisting of a first label option denoting that the continuous characteristic being analyzed is at or above the first threshold and a second label option denoting that the continuous characteristic being analyzed is below the first threshold.

4. The method of claim 1, wherein:
a second label of the at least two labels is designed around a second threshold of the at least two thresholds; and
the second label is selected from a group consisting of a first label option denoting that the continuous characteristic being analyzed is at or above the second threshold and a second label option denoting that the continuous characteristic being analyzed is below the second threshold.

5. The method of claim 1, wherein a first prediction of the at least two predictions is selected from the group consisting of a positive prediction denoting that the first threshold was met and a negative prediction denoting that the first threshold was not met.

6. The method of claim 1, wherein a second prediction of the at least two predictions is selected from the group consisting of a positive prediction denoting that the second threshold was met and a negative prediction denoting that the second threshold was not met.

7. A computer system comprising:
one or more computer processors;
one or more computer readable storage media;
program instructions stored on the computer readable storage media for execution by at least one or more processors, the program instructions comprising:
program instructions to receive an image tagged with a single value, wherein the single value is from a set of ordered values;
program instructions to set at least two thresholds within the set of ordered values;
program instructions to derive at least two labels for the image from the single value tagged in the image and the at least two thresholds, wherein the at least two labels each represent a different subset range of ordered values of the set of ordered values;
program instructions to run the image through an image classifier, wherein the image classifier classifies the image based on the at least two labels and the at least two thresholds;
program instructions to receive at least two predictions from the image classifier; and
program instructions to adjust the image classifier based on differences between the at least two predictions and the at least two labels.

8. The computer system of claim 7, wherein the set of ordered values define a continuous characteristic in the image.

9. The computer system of claim 7, wherein:
a first label of the at least two labels is designed around a first threshold of the at least two thresholds; and
the first label is selected from the group consisting of a first label option denoting that the continuous characteristic being analyzed is at or above the first threshold and a second label option denoting that the continuous characteristic being analyzed is below the first threshold.

10. The computer system of claim 7, wherein:
a second label of the at least two labels is designed around a second threshold of the at least two thresholds; and
the second label is selected from a group consisting of a first label option denoting that the continuous characteristic being analyzed is at or above the second threshold and a second label option denoting that the continuous characteristic being analyzed is below the second threshold.

11. The computer system of claim 7, wherein a first prediction of the at least two predictions is selected from the group consisting of a positive prediction denoting that the first threshold was met and a negative prediction denoting that the first threshold was not met.

12. The computer system of claim 7, wherein a second prediction of the at least two predictions is selected from the group consisting of a positive prediction denoting that the second threshold was met and a negative prediction denoting that the second threshold was not met.

13. A computer program product comprising:
one or more computer readable storage media and program instructions stored on the one or more computer readable storage media, the program instructions comprising:
program instructions to receive an image tagged with a single value, wherein the single value is from a set of ordered values;
program instructions to set at least two thresholds within the set of ordered values;
program instructions to derive at least two labels for the image from the single value tagged in the image and the at least two thresholds, wherein the at least two labels each represent a different subset range of ordered values of the set of ordered values;
program instructions to run the image through an image classifier, wherein the image classifier classifies the image based on the at least two labels and the at least two thresholds;
program instructions to receive at least two predictions from the image classifier; and
program instructions to adjust the image classifier based on differences between the at least two predictions and the at least two labels.

14. The computer program product of claim 13, wherein the set of ordered values define a continuous characteristic in the image.

15. The computer program product of claim 13, wherein:
a first label of the at least two labels is designed around a first threshold of the at least two thresholds; and
the first label is selected from the group consisting of a first label option denoting that the continuous characteristic being analyzed is at or above the first threshold and a second label option denoting that the continuous characteristic being analyzed is below the first threshold.

16. The computer program product of claim 13, wherein:
a second label of the at least two labels is designed around a second threshold of the at least two thresholds; and
the second label is selected from a group consisting of a first label option denoting that the continuous characteristic being analyzed is at or above the second threshold and a second label option denoting that the continuous characteristic being analyzed is below the second threshold.

17. The computer program product of claim 13, wherein each of the at least two predictions is selected from the group consisting of a positive prediction denoting that the second threshold was met and a negative prediction denoting that the second threshold was not met.

* * * * *